United States Patent
Yashar et al.

(10) Patent No.: US 7,965,694 B2
(45) Date of Patent: Jun. 21, 2011

(54) WIRELESS PACKET COMMUNICATIONS SYSTEM AND METHOD

(75) Inventors: Haim Yashar, New York, NY (US); Abraham Shani, Nez Tziona (IL); Meir Meiner, Hadera (IL)

(73) Assignee: TCM Mobile LLC, Overland Park, KS (US)

( * ) Notice: Subject to any disclaimer, the term of this patent is extended or adjusted under 35 U.S.C. 154(b) by 664 days.

(21) Appl. No.: 12/120,305

(22) Filed: May 14, 2008

(65) Prior Publication Data

US 2008/0219231 A1 Sep. 11, 2008

Related U.S. Application Data

(63) Continuation of application No. 11/075,781, filed on Mar. 9, 2005, now Pat. No. 7,406,069.

(51) Int. Cl.
*H04Q 7/24* (2006.01)
(52) U.S. Cl. .......................... 370/338; 370/328; 370/352
(58) Field of Classification Search .................. 370/328, 370/338, 352, 426.2; 455/561, 39, 41.2
See application file for complete search history.

(56) References Cited

U.S. PATENT DOCUMENTS

| | | | |
|---|---|---|---|
| 6,088,337 A | 7/2000 | Eastmond et al. | |
| 6,611,516 B1 | 8/2003 | Pirkola et al. | |
| 6,615,236 B2 | 9/2003 | Donovan et al. | |
| 6,628,943 B1 | 9/2003 | Agrawal et al. | |
| 6,681,252 B1 | 1/2004 | Schuster et al. | |
| 6,693,894 B1 | 2/2004 | Anderson et al. | |
| 6,732,176 B1 | 5/2004 | Stewart et al. | |
| 6,738,362 B1 | 5/2004 | Xu et al. | |
| 6,775,253 B1 | 8/2004 | Agrawal et al. | |
| 6,788,660 B1 | 9/2004 | Agrawal et al. | |
| 7,120,136 B2 * | 10/2006 | Upp et al. | 370/331 |
| 7,499,401 B2 * | 3/2009 | Buddhikot et al. | 370/235 |
| 7,675,901 B2 * | 3/2010 | Wang et al. | 370/352 |
| 7,835,328 B2 * | 11/2010 | Stephens et al. | 370/338 |
| 7,853,250 B2 * | 12/2010 | Harvey et al. | 455/421 |
| 2002/0035699 A1 | 3/2002 | Crosbie | |
| 2003/0027595 A1 | 2/2003 | Ejzak | |
| 2003/0074470 A1 | 4/2003 | Karino | |
| 2003/0193952 A1 | 10/2003 | O'Neill | |
| 2003/0196107 A1 | 10/2003 | Robertson et al. | |

(Continued)

OTHER PUBLICATIONS

Office Action for U.S. Appl. No. 11/075,781 mailed Jul. 20, 2007.

(Continued)

*Primary Examiner* — CongVan Tran
(74) *Attorney, Agent, or Firm* — Nixon Peabody LLP (57) ABSTRACT

An access point in a wireless packet communication system is disclosed. The access point has an antenna for receiving IP data encoded according to a wireless IP communication protocol. The access point also has a combiner having an input coupled to said antenna and having first and second outputs. The access point further has a first decoder for receiving encoded IP data on a first channel at a first output of said combiner. The access point also has a second decoder for receiving encoded IP data on a second channel at a second output of said combiner. The access point further has a router for receiving unencoded IP data from said first decoder at a first input, and receiving unencoded IP data from said second decoder at a second input, said router having a single output for passing unencoded IP data from said first decoder and said second decoder.

4 Claims, 8 Drawing Sheets

U.S. PATENT DOCUMENTS

| | | |
|---|---|---|
| 2003/0228868 A1 | 12/2003 | Turanyi et al. |
| 2004/0023653 A1 | 2/2004 | O'Neill |
| 2004/0073786 A1 | 4/2004 | O'Neill et al. |
| 2004/0228324 A1 | 11/2004 | Alexiou et al. |
| 2004/0240430 A1 | 12/2004 | Lin et al. |
| 2005/0025164 A1 | 2/2005 | Kavanagh et al. |

OTHER PUBLICATIONS

Office Action for U.S. Appl. No. 11/075,781 mailed Mar. 25, 2008.

\* cited by examiner

WIRELESS PACKET COMMUNICATIONS SYSTEM AND METHOD

CROSS REFERENCE TO RELATED APPLICATIONS

This application is a continuation of U.S. patent application Ser. No. 11/075,781, entitled, "WIRELESS PACKET COMMUNICATIONS SYSTEM AND METHOD" which was filed on Mar. 9, 2005. The parent Ser. No. 11/075,781 application and this application also claim the benefit of U.S. Provisional Application Ser. No. 60/570,561, filed May 13, 2004.

TECHNICAL FIELD

The present invention is related to wireless voice and data transmission systems, and, more particularly, to wireless transmission systems which transmit internet protocol IP data.

BACKGROUND OF THE INVENTION

Voice over IP (VoIP) systems are being used to, among other things, replace conventional PBX's in offices. Wireless fidelity (Wi-Fi) systems, which transmit IP data, are being deployed in office buildings and on campuses to obviate the need for a wired LAN connection for computers and other equipment that is networked, and to provide wireless telephone service (wireless VoIP) as an alternative to conventional cellular systems such as TDMA, CDMA, GSM, and 3G. At present the conventional cellular systems' coverage area is much greater than the total area covered by wireless VoIP systems for several reasons, a main reason being the relative newness of the wireless VoIP system. However, there are other problems deploying wireless VoIP systems such as battery capacity and tolerance to RF disturbances. On the other hand, Wi-Fi systems, because they transmit IP data directly between the individual computer or similar equipment (the client) and an access point (AP) provide significantly higher data rates than conventional cellular systems available today or will be available in the near future.

Mobile wireless VoIP telephones require more intensive data processing than conventional cellular telephones and therefore require more battery power and consequently more frequent battery charging or larger capacity (and heavier) batteries than conventional cellular telephones. A method to reduce the battery drain is to reduce the RF transmission signal level from the telephone. This results in smaller areas of coverage for each access point (AP)/base station than for each base station in a conventional cellular system, and consequently more base stations are required than conventional cellular base stations for a particular area. Therefore, the cost of purchasing and installing each base station is more of a critical factor in wireless VoIP systems.

While the conventional cellular systems were initially designed for roaming from one cell to another without a disturbance in the voice communication, the Wi-Fi system was initially designed for electronic equipment which can tolerate gaps in the data flow to the equipment. The most common protocol for wireless IP communication is the IEEE 802.11 standard. This standard requires termination of a first connection between a user and an AP before connection to the new AP, then reauthentication usually including encryption coordination and establishment of a new connection. This process produces gaps in the voice transmission which are noticeable to a Wi-Fi telephone user.

Therefore, it can be appreciated that a Wi-Fi system for mobile users over a wide area such as a metropolitan area that is relatively inexpensive to build, and that provides virtually uninterrupted voice transmission when a mobile telephone user is changing connections from one AP to another is highly desirable.

It is an object of the present invention to provide an AP configuration that is relatively inexpensive to build and install.

It is a further object of the invention to provide a Wi-Fi system that does not create disturbances for mobile telephone user.

It is a still further object of the invention to provide a Wi-Fi system that can be used for both voice and computer data without degrading the voice communications and that is not significantly more expensive than a voice only system.

SUMMARY OF THE INVENTION

Briefly described, a wireless packet data communication system that provides communication to a mobile communication device includes a plurality of access points. Each sector has an antenna that transmits and receives wireless communication with the mobile communication device. Coupled to the antenna is a frame encoder and decoder that encodes and decodes frames of data passing through the antenna.

Preferably, a SIP wireless connection with a mobile communication device is transferred from a first access point antenna to a second access point antenna by storing an IP address of the mobile communication device used during the SIP wireless connection, then disassociating the mobile communication device from the first access point antenna and associating and authenticating the mobile communication device with the second access point including reassigning the same IP address to the mobile communication device and continuing the SIP session from the connection with the first access point antenna.

BRIEF DESCRIPTION OF THE DRAWINGS

These and other features and advantages of the invention will be more fully understood and appreciated from the following description of certain exemplary embodiments of the invention taken together with the accompanying drawings, in which.

It will be appreciated that for purposes of clarity and where deemed appropriate, reference numerals have often been repeated in the figures to indicate corresponding features, and that the various elements in the drawings have not necessarily been drawn to scale in order to better show the features of the invention.

DESCRIPTION OF THE PREFERRED EMBODIMENTS

Figure 1:
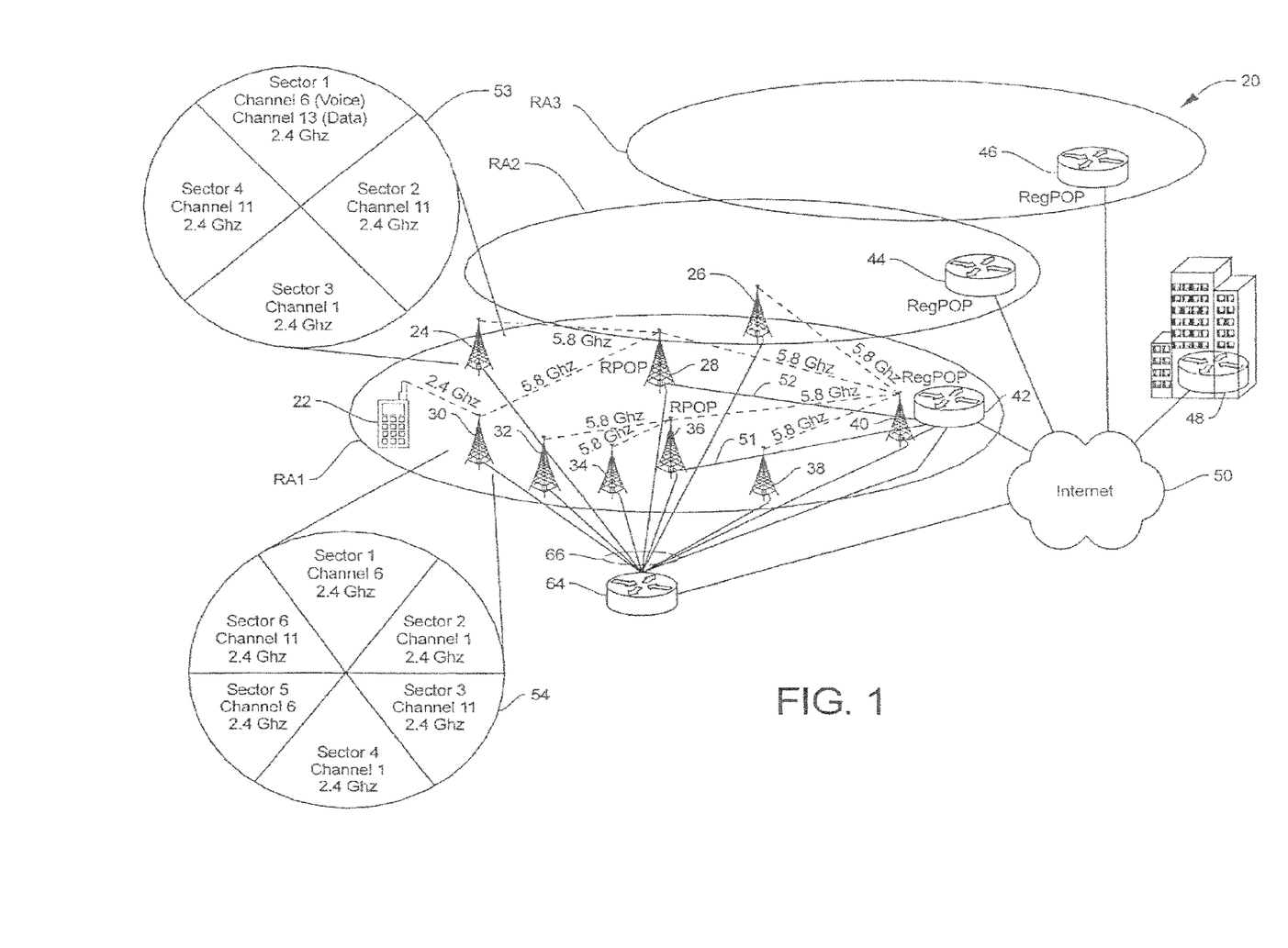
FIG. 1 is a conceptual perspective diagram of a wireless packet communication system according to the present invention.

Turning now to the drawings, FIG. 1 is a conceptual diagram of a packet communications system 20 according to the present invention. The packet communications system 20 includes a Wireless-Fidelity (Wi-Fi) section that is shown in FIG. 1 as three regional areas (RAs) RA1, RA2, and RA3, and a mobile communication device 22. Each of the RAs has a plurality of base stations, however, for simplicity base stations are only illustrated in RA1. FIG. 1 shows seven base stations 24, 26, 28, 30, 32, 34, 36, 38 and 40 in RA1 which communicate with the mobile wireless communication device 22 at 2.4 GHz. It will be appreciated that the number of RAs can vary depending on the geographical area covered, and that the number of base stations in each RA can vary depending upon various factors including the size of the geographical area of the RA, the obstructions to RF communication within the RA, the anticipated number of simultaneous mobile wireless connections to each base station, and the cost of each base station.

The areas covered by each of the base stations 24-40 overlap so that there is complete coverage in RA1, and RA1, RA2, and RA3 overlap such that there are no gaps in coverage between the RAs. The number of RAs, and therefore the region covered by the system, is virtually unlimited, the larger area requiring more base stations and larger bandwidth connections through the internet 50.

Also shown in FIG. 1 are three regional points of presence (RegPOP) 42, 44, and 46. The RegPOPs process the Wi-Fi traffic to and from each Base Station in RA1, RA2, and RA3 generally over a 5.8 GHz RF link, although a wired connection can be used instead. A core network site or national office 48 is connected to each of the RegPOPs 42, 44, and 46 by the internet 50.

Intermediate 5.8 GHz relay points, referred to herein as RPOPs, can be used where a direct 5.8 GHz connection between a base station and a RegPOP is not feasible. These RPOPs can also be a base station such as base stations 28 and 36. The RPOP at base station 28 relays 5.8 GHz communications between base stations 24, 30 and RegPOP 42, while the RPOP at base station relays 5.8 GHz communications between base stations 32, 34 and RegPOP 42. Alternatively, the RPOPs 28 and 36 can be connected to the RegPOP 42 by wired connections 51 and 52, respectively rather than the 5.8 GHz RF connections.

Each of the base stations has four or six 2.4 GHz antennas for RF communication with the mobile communication device 22. The base stations with four 2.4 GHz antennas have their beams directed at 90 degree rotational offsets in the horizontal plane as shown in diagram 53. Similarly, the base stations with six 2.4 GHz antennas have their beams directed at 60 degree rotational offsets in the horizontal plane as shown in diagram 54.

The 2.4 GHz communication between the base stations and mobile communication device 22 conforms to the IEEE 802.11 standard; more specifically, the 802.11 b and 802.11 g standards. The 802.11 b standard has a 11 Mbps data rate while the 802.11 g standard has a 54 Mbps data rate, but the 802.11 b standard is able to communicate over longer distances than the 802.11 g standard. With wireless mobile audio communication devices 22 which can operate under both 802.11 b and 802.11 g, the base stations 24-40 detect the signal strength of the transmission from the wireless mobile audio communication device 22, and if it is high enough, the wireless mobile audio communication device 22 and the base stations 24-40 communicate using the 802.11 g standard to take advantage of the higher data rate which allows more simultaneous connections to one of the 2.4 GHz antennas without degrading the transmissions. If the signal strength isn't high enough for the 802.11 g standard, but is high enough for the 802.11 b standard, then the 802.11 b standard is used. In practice only about five percent of the 11 Mbps and 54 Mbps data rate can be used to provide a high quality audio transmission. The system in the preferred embodiment of the present invention uses a VoIP CODEC, which requires a voice bandwidth of about 40 Kbps. Thus an antenna on base stations 24-40 transmitting and receiving signals using the 802.11 b standard can provide simultaneous transmissions with about 10 to 14 wireless communication devices 22, while an antenna transmitting and receiving signals using the 802.11 g standard can provide simultaneous transmissions with about 65 to 70 wireless audio communication devices 22. A wireless audio mobile communication device 22, when roaming into an AP area, may necessitate using the 802.11 b standard, but as the audio mobile communication device 22 continues to move in the AP area, the signal strength may improve such that the 802.11 g standard can be used.

Although 802.11 b and g provide 13 channels, the system of the present invention uses only channels 1, 6 and 11 for voice to minimize disturbances in the RF transmissions. The channel assignments of each antenna for the four antenna base station and the six antenna base station are shown in diagrams 53 and 54, respectively.

Installing a base station having four or six antennas as well as selecting the number and placement of the base station is determined mainly by the maximum number of anticipated simultaneous communications at each base station, the RF disturbances present in the base station area, the RF disturbances along the 5.8 GHz path from the base station to the RPOP or RegPOP, and the costs of the four antenna and six antenna base stations.

Also shown in FIG. 1 is a router 64 and a plurality of wired connections 66 to each of the base stations 24-40, RPOPs 28 and 38 and the RegPOP 42. The router 64 and wired connections 66 are part of an out-of-band (OOB) network which monitors the wireless system and provides operating commands to the various elements of the system. The router 64 is connected through the RegPOP 42 and through the internet 50 to a server and operator interface to the OOB network in the national office 48. In the preferred embodiment the wired connections 66 are fast network connections.

Figure 2:
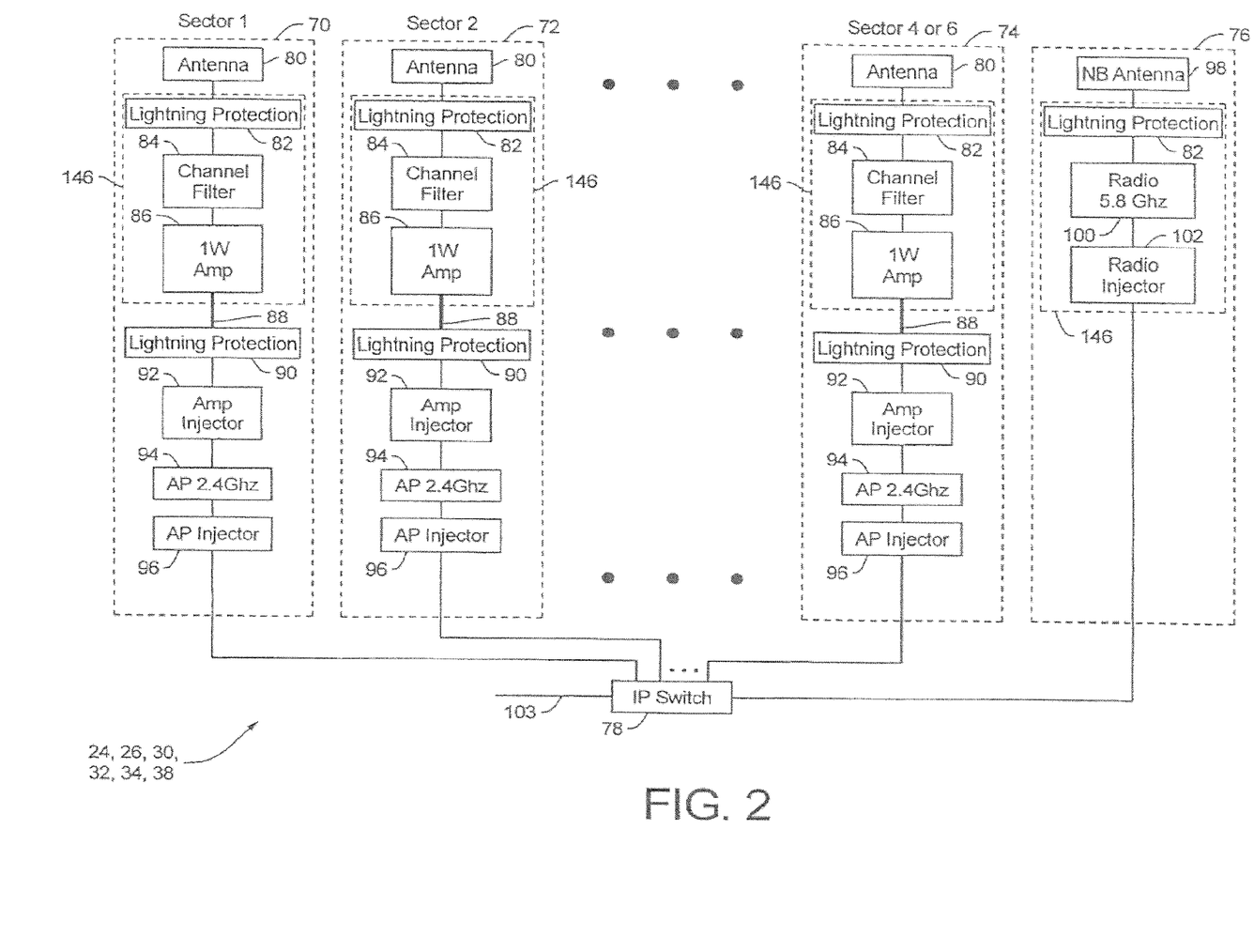
FIG. 2 is a block diagram of some of the base stations shown in FIG. 1.

FIG. 2 is a block diagram of base stations 24, 28, 30, 32, 34, and 36. Shown in FIG. 2 are three sections 70, 72, and 74 that are the electronics exclusive to the 2.4 GHz 802.11 sectors 1, 2, and 4 or 6, respectively. A fourth section 76 shows the 5.8 GHz 802.11 electronics for the base stations 24, 28, 30, 32, 34, and 38. The sections 70, 72, 74, and 76 have electrical connections to an switch 78. The sector electronics comprise a 2.4 GHz antenna 80 connected through a lightning protector 82 to a channel filter 84 that, in turn, is connected to a 1 watt amplifier 86. The 1 watt amplifier 86 is connected by a low loss cable 88 to another lightning protector 90 that is also connected to an AP 2.4 GHz 802.11 interface 94 by an amp injector 92. The AP 2.4 GHz 802.11 interface 94 is connected to an AP injector 96, that is also connected to the switch 78.

Section 76 includes a narrow band 5.8 GHz antenna 98 connected through a lightning protector 82 to a 5.8 GHz 802.11 interface or radio 100. The 5.8 GHz radio 100 is connected to a radio injector 102 that, in turn, is connected to the switch 78. In some cases a wired connection to RegPOP 42 or to a RPOP is made through a cable 103. In those cases, section 76 would not be used since the cable 103 would provide a direct IP connection obviating the need for the 5.8 GHz 802.11 link.

In the preferred embodiment, the antennas 80 are multipolarized.

In operation the mobile communication device 22 establishes an 802.11 compliant communication with the AP 2.4 GHz 802.11 interfaces 94 through a signal path that includes the antenna 80, lightning protector 82, channel filter 84, 1 watt amplifier 86, low impedance connection 88, lightning protector 90, and amplifier injector 92. The IP data to and from the AP 2.4 GHz 802.11 interfaces 94 after the 802.11 frame structure is passed through the AP injector 96 to and from the switch 78. In base stations 24, 26, 30, 32, 34, and 38 the data is passed through the radio injector 102 and to and from the 5.8 GHz radio 100 which communicates with an RPOP 28 or 36 or AP 40 using the 802.11 communication interface.

Figure 3:
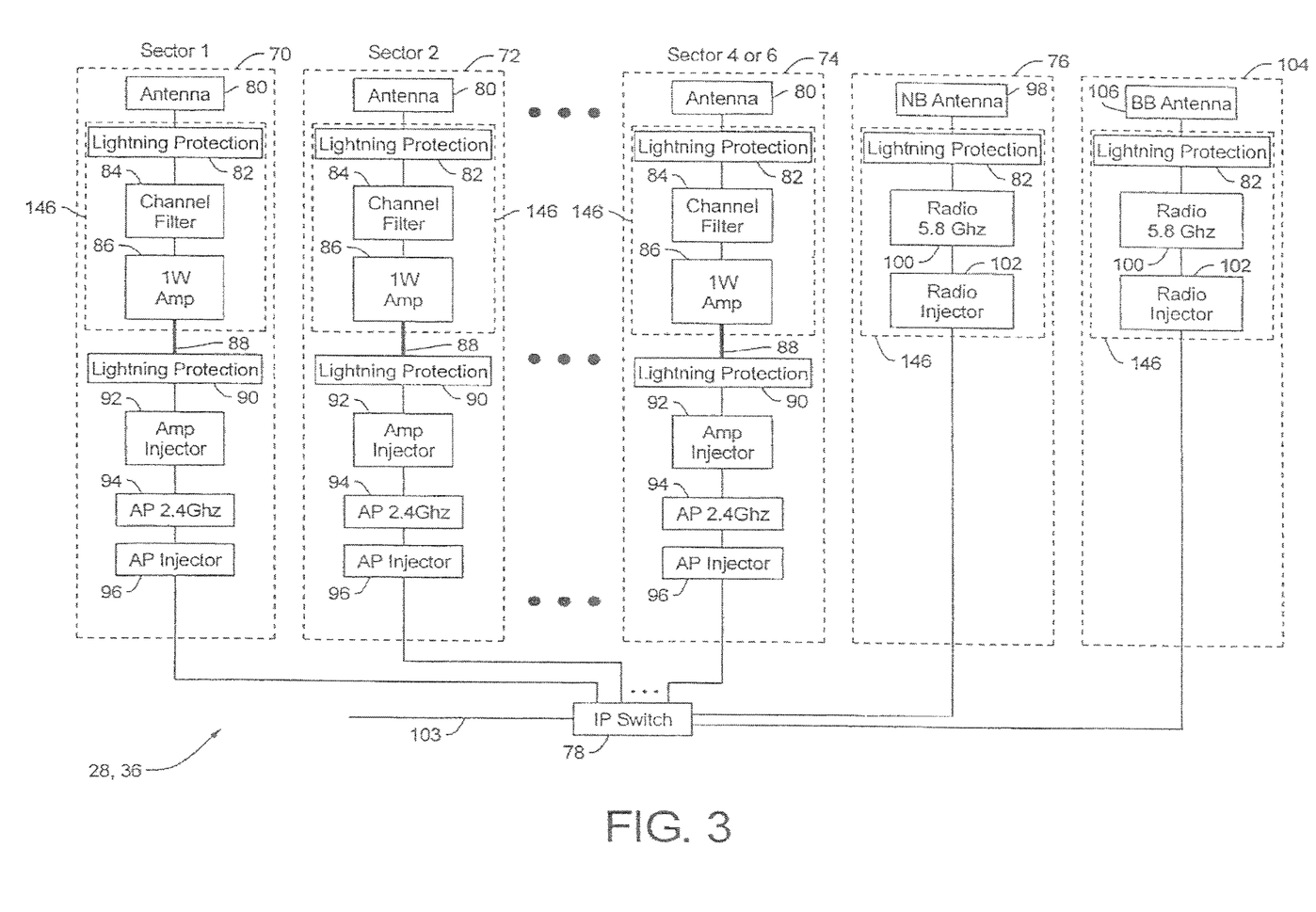
FIG. 3 is a block diagram of some of the base stations shown in FIG. 1 and not shown in FIG. 2.

FIG. 3 is a block diagram of base stations 28 and 36. The block diagram for base stations 28 and 36 is the same as the block diagram of FIG. 2 but with the addition of another section 104 which is the same as section 76 except that the narrow beam 5.8 GHz antenna 98 is replaced by a broad beam 5.8 GHz antenna 106. The broad beam 5.8 GHz antenna 106 communicates with the narrow band 5.8 GHz antennas 98 of the base stations 24, 30, 32, and 34.

Base station 40 has the same block diagram as FIG. 3 except that section 76 is missing since the connection between the base station 40 and the RegPOP 42 is through cable 103. Base station 40 could also be configured without the 2.4 GHz sections 70-74 and thus consist of a section 104 and switch 78 with the cable connection 103 to the RegPOP 42.

The base stations 24-38 can operate without a special IP cable which reduces the cost of installation and operating fees for the base stations.

Figure 4:
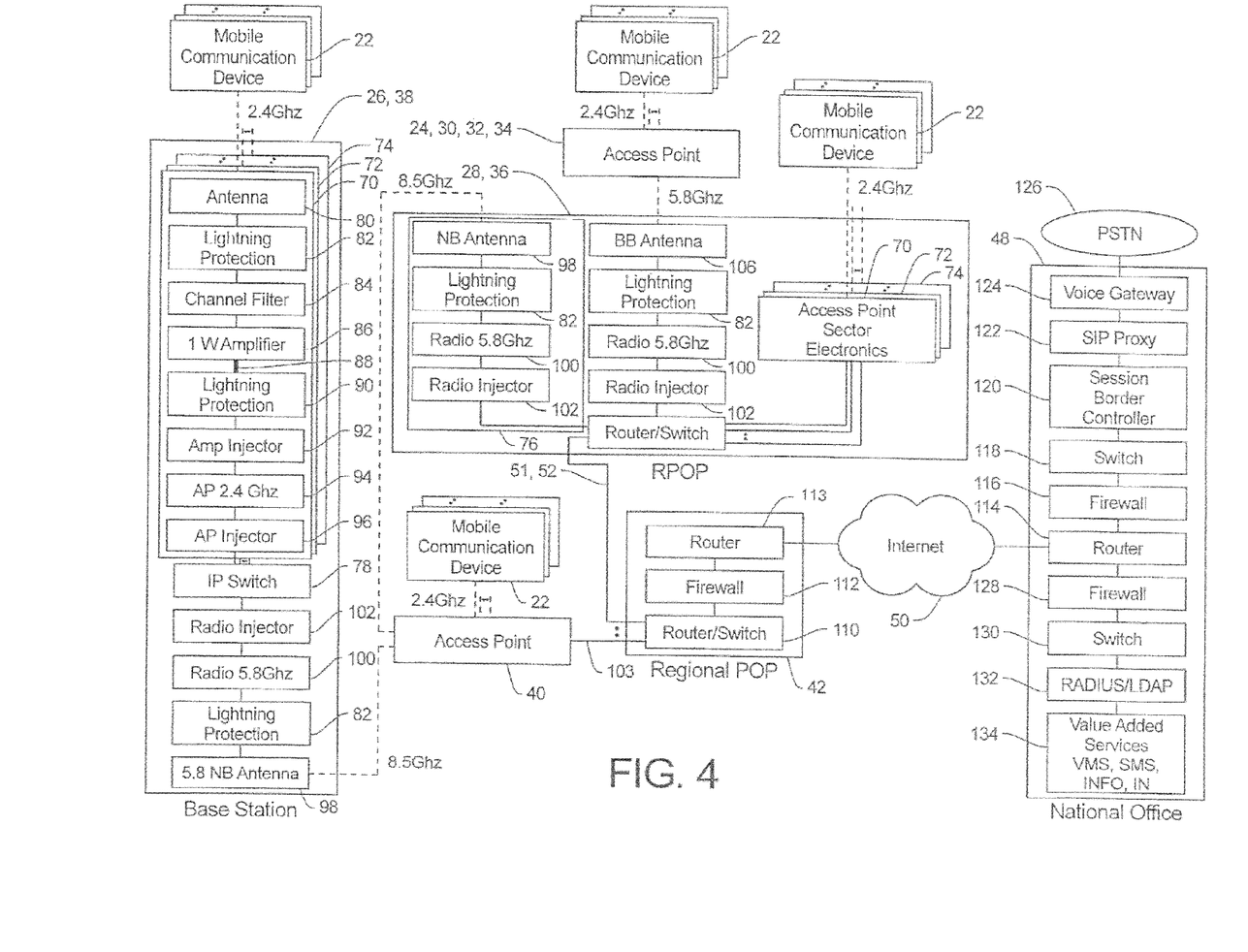
FIG. 4 is a block diagram of the wireless packet communication system shown in FIG. 1.

FIG. 4 is a block diagram that includes RA1, RPOPs 28 and 36, RegPOP 42 and the national office 48. The block diagrams for the base station 24-40 have been described above. The RegPOP 42 transfers IP data with the base station in router/switch 110 and transfers the data through a firewall 112 that is connected with a router 113 that, in turn, is connected to the internet 50. Voice data is passed between the RegPOP 42 and the national office 48 through a virtual private network in the internet 50. Computer IP data (i.e., data for another computer or an IP network) is transferred to and from the public portion of the internet 50 at each of the RegPOPs 42, 44, and 46 which have their own separate internet addresses. Connected to the internet 50 in the national office 48 is a router 114 that has a connection to a firewall 116 that, in turn, is connected to a switch 118. The switch 118 is also connected to a session border controller 120 that in turn is connected to a SIP proxy 122. The SIP proxy 122 is connected to a voice gateway 124 that interfaces the public switched telephone network (PSTN) 126 to complete the connection between a voice mobile communication device 22 and a caller using the PSTN 126.

The router 114 has another connection that is to another firewall 128 that, in turn, is connected through a switch 130 to a RADIUS/LDAP server 132 that stores information on the mobile communications devices 22. The RADIUS/LDAP server 132 is also connected to a value added services module 134 that includes VMS (voice mail system), SMS (short message service), INFO, and IN (intelligent network).

Figure 5:
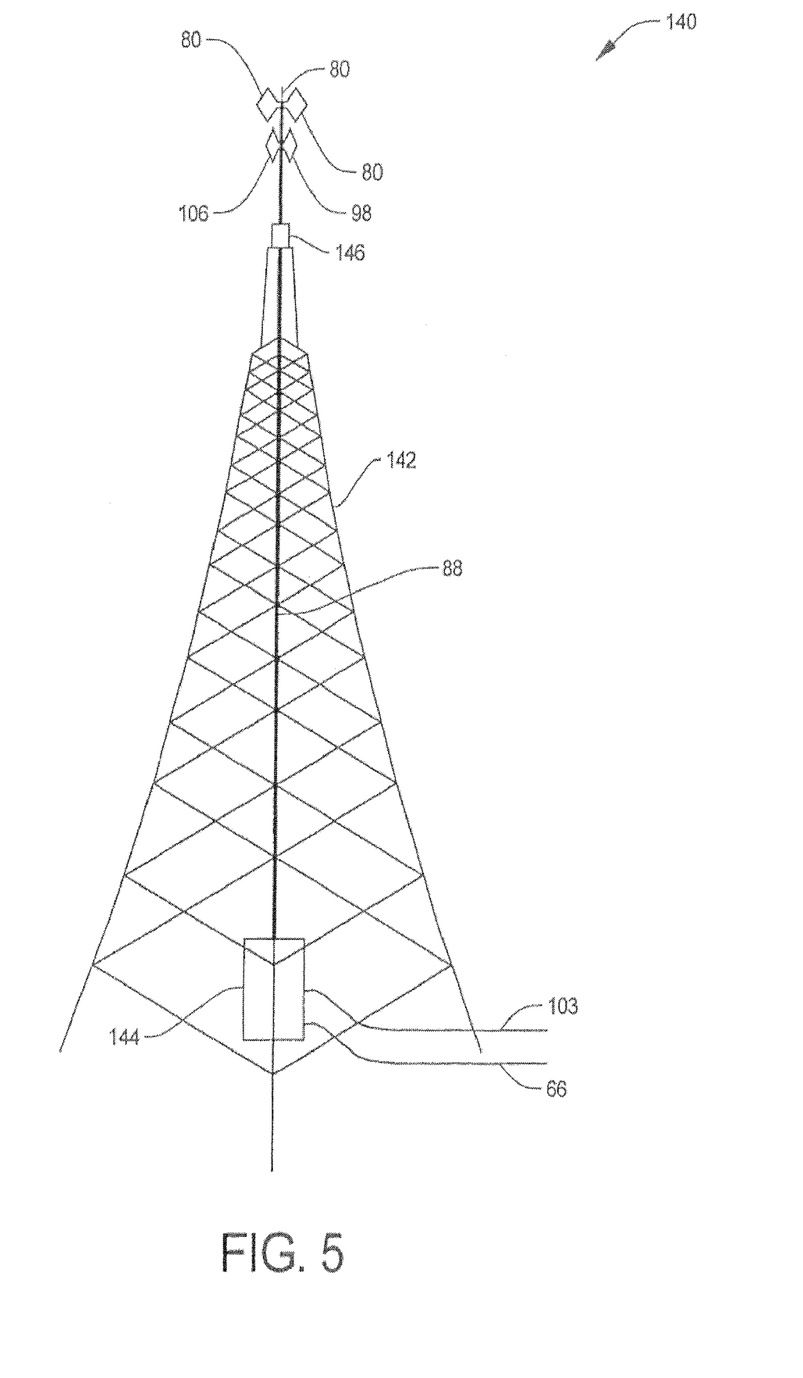
FIG. 5 is a conceptual physical depiction of a base station shown in FIG. 1.

FIG. 5 is a conceptual representation 140 of a base station according to the present invention. Shown in FIG. 5 is a tower having a cable 88 through the tower from a lower electronics enclosure 144 to an upper electronics enclosure 146. Attached to the top of the tower 142 are four or six 2.4 GHz antennas 80. Shown below the 2.4 GHz antennas 80 are the two 5.8 GHz antennas 98 and 106. The upper electronics enclosure 146 holds the electronic blocks within the dashed lined rectangles 146 shown in FIGS. 2 and 3. The rest of the electronics at the base station are located in the lower enclosure 144. The lower enclosure has a first cable passing through a wall of the enclosure that is one of the OOB cables 66 shown in FIG. 1, and the lower enclosure 144 may also have a second cable 103 passing through the wall of the enclosure. Cable 103 is shown in FIGS. 2, 3, and 4. It will be appreciated that a tower is not required for a base station. A base station can be mounted on the side or top of a building, for example. Also, since the coverage area for each base station is smaller than the coverage area for a conventional cellular phone base station, the height needed for the cellular base station antenna is not necessarily required for a base station antenna.

Figure 6:
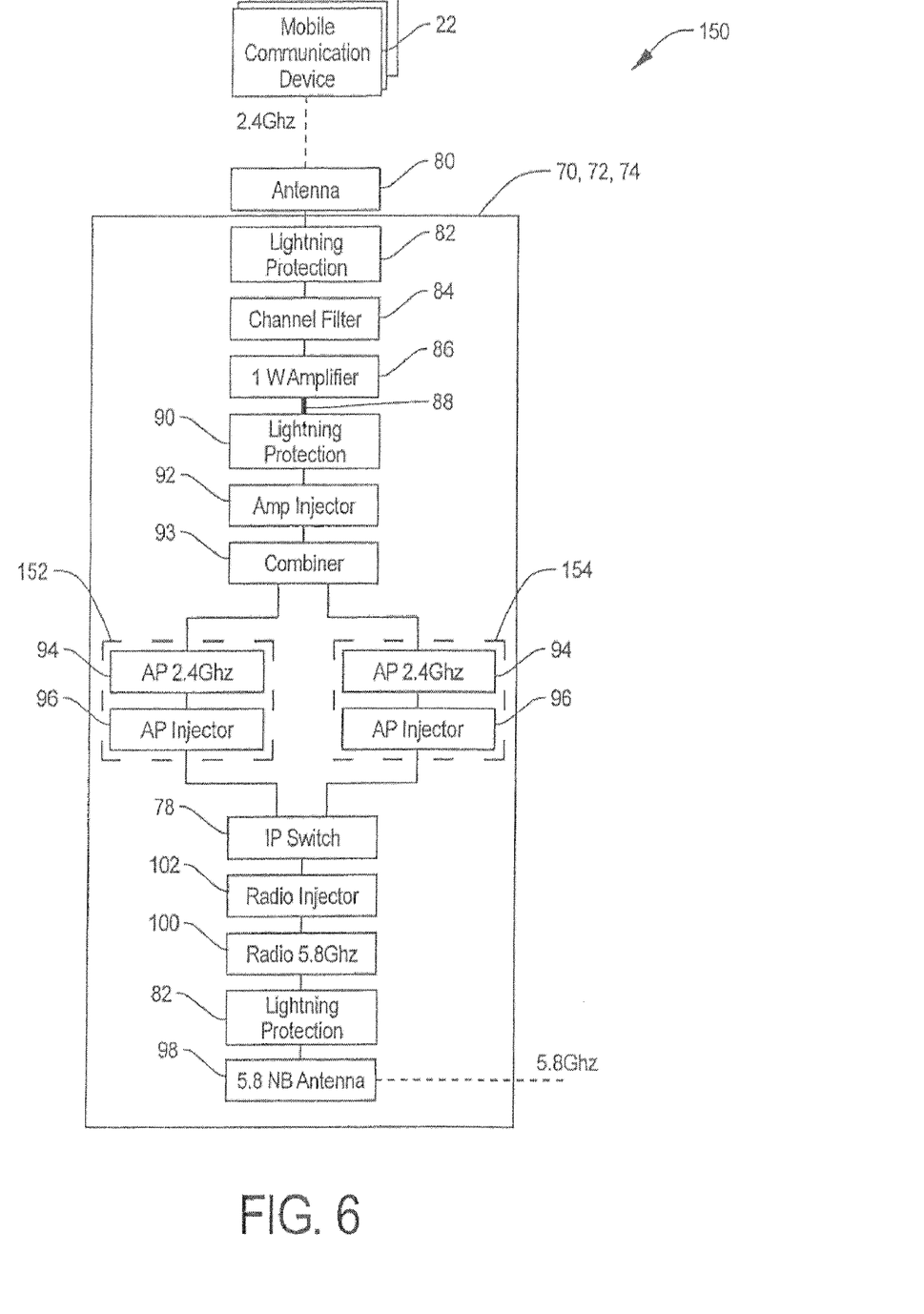
FIG. 6 is a block diagram a portion of a base station shown in FIG. 1.

The system of FIG. 1 is primarily for voice communication. To also handle data communication, the base station needs to be modified as shown in FIG. 6 by providing two parallel communication paths, a first communication path 152 and a second communication path 154 and by placing voice data and computer data on separate channels defined in the 802.11 standard. The diagram 53 of FIG. 1 shows a top sector which can be used for both voice and computer data with the voice data on channel 6 and the computer data on channel 13. Each of the communication paths 152 and 154 have an AP 2.4 GHz 802.11 interface, and an AP injector 96. The AP 2.4 GHz interface 94 in communication path 152 encodes and decodes 802.11 frames in channels 1, 6, and 11, while the AP 2.4 GHz interface 156 in communication path 152 encodes and decodes 802.11 frames in other channels, such as channel 13, that are used for computer data. A combiner 93 combines and splits the signals between the amp injector 92 and the AP 2.4 GHz 802.11 interface 94 in each of the communication paths 152 and 154. The IP data to and from the AP injectors 96 passes through the switch 78. When a 2.4 GHz 802.11 interface has been established and data from the mobile communications device 22 is passing through the system, the national office 48 detects if voice data or computer data is being transferred to and from the mobile communication device 22. If the communication is voice communication, the first communication path 152 is used, and if the communication is computer data, the second communication path 154 is used. The two communication paths 152 and 154 are necessary because the computer data transmitted is much more dense than the voice data. The delays due to retries required because of the denser traffic would degrade the quality of the voice transmission, but generally can be tolerated in computer data exchanges.

Figure 7:
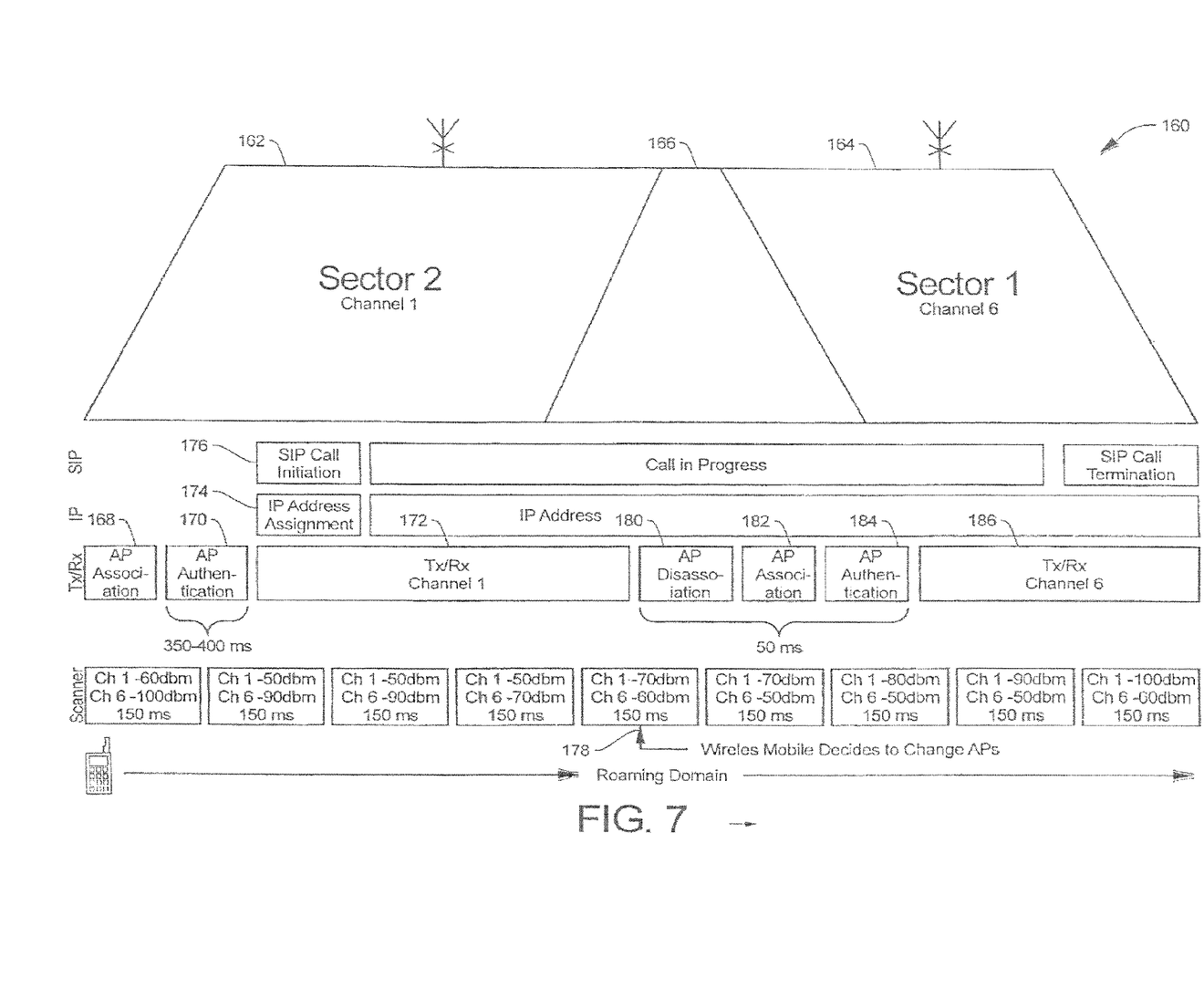
FIG. 7 is a timing diagram of the handoff of a mobile user moving and switching from one sector to another.

FIG. 7 is a timing diagram 160 of a mobile communications device 22 handoff process when the mobile communications device roams from one sector connection to another sector connection. At the top of FIG. 7 is a perspective view of a horizontal slice near a base station. A region 162 shows the area where the predominant signal strength is to and from a sector 2 and region 164 shows the area where the predominant signal strength is to and from a sector 1. The area 166 is the crossover region between the areas 162 and 164. In the example of FIG. 7 a mobile communications device 22 initiates a telephone call with an AP association shown in block 168. After the AP association, an AP authentication occurs as shown in block 170. This initial authentication takes about 350 to 400 ms. Once the authentication is complete, normal voice transmission using sector 2 occurs as shown in block 172. Also, after the authentication, an IP address is assigned as shown in block 174 and a SIP call initiation occurs as shown in block 176. As shown in the bottom row of FIG. 7, as the mobile communication device 22 travels, the signal strengths for sector 2 and sector 1 change. The mobile communications device 22 operates in the power save mode and uses the rest time to measure the signal strength from the surrounding sectors.

When the mobile communications device 22 senses that another sector has a 3 dB greater signal than the sector that the mobile communication device 22 is currently communicating with, as occurs at point 178, the mobile communications device 22 dissociates from sector 2 in this example as shown in block 180, associates with sector 1 as shown in block 182, authenticates with sector 1 as shown in block 184, and resumes normal communication as shown in block 186 using sector 1 instead of sector 2. Advantageously, the system of the present invention keeps the IP address and SIP connection alive for one or two seconds after the mobile communication device 22 disassociates so that the mobile communication device 22 can reassociate and reauthenticate in about 50 ms which does not cause a disturbance noticeable to the user of the mobile communication device 22. The system of the present invention also remembers the key used in the last connection for a few seconds so that the authentication and WEP/WPA/WPA2 encryption can be quickly reestablished.

Figure 8:
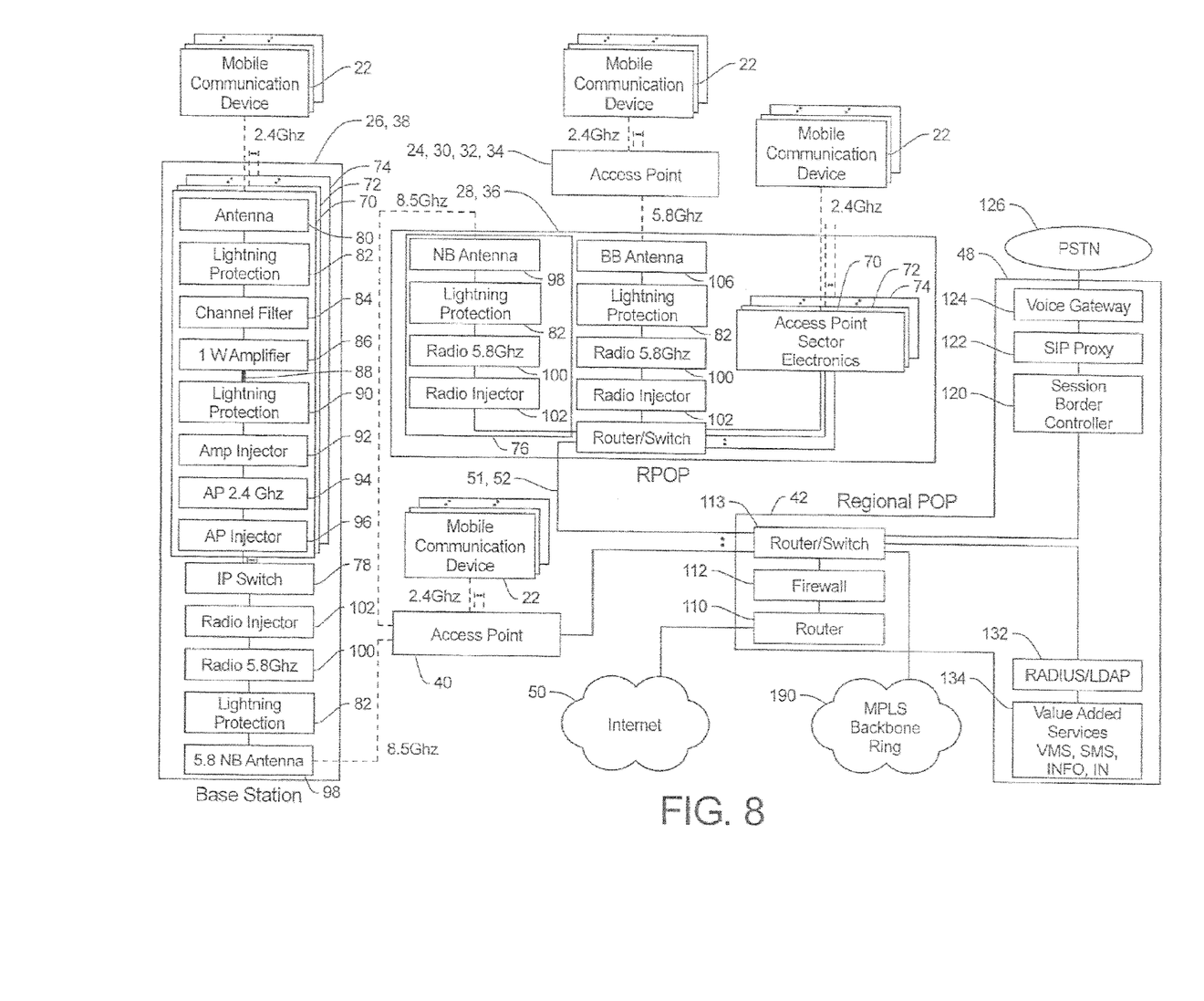
FIG. 8 is a block diagram of a wired packet communication system where the functions of the national office shown in FIG. 4 have been shifted to the regional point-of-presence.

FIG. 8 is a block diagram of a wired packet communication system in which the functions of the national office 48 shown in FIG. 4 have been shifted to the regional point-of-presence and a Multiprotocol Label Switching (MPLS) backbone ring 190 that is a network available in many countries of the world. As shown in FIG. 8 the router/switch 113 transfers data to and from access point 40 and optionally to and from other access points such as access points 28 and 36. The router/switch 113 is coupled to the internet 50 through the firewall 112 and router 110. The router/switch 113 is coupled to the MPLS backbone ring 190 and to the session border controller 120 and the RADIUS/LDAP server 132. By moving the national office 48 functions to the RegPOP, router 114, firewalls 116 and 128, and switches 118 and 130 have been eliminated. However, instead of having only one national office, the remaining blocks of the national office have to be duplicated at each RegPOP. In some alternative embodiments of FIG. 8 The RADIUS/LDAP server 132 and value added services 134 can be located in a national office and the MPLS backbone ring used to provide high speed connections between the alternative RegPOP and the alternative national office.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An access point in a wireless packet communication system comprising:
    a) an antenna for receiving IP data encoded according to a wireless IP communication protocol;
    b) a combiner having an input coupled to said antenna and having first and second outputs;
    c) a first decoder for receiving encoded IP data on a first channel at a first output of said combiner;
    d) a second decoder for receiving encoded IP data on a second channel at a second output of said combiner; and
    e) a router for:
        1) receiving unencoded IP data from said first decoder at a first input, and
        2) receiving unencoded IP data from said second decoder at a second input, said router having a single output for passing unencoded IP data from said first decoder and said second decoder.

2. The access point in a wireless packet communication system set forth in claim 1 further comprising:
    f) a narrow beam antenna capable of transmitting wireless communication with a broad beam antenna at another access point; and
    g) a wireless IP communication protocol encoder comprising:
        1) an input coupled to the router single output; and
        2) an output coupled to the narrow beam antenna.

3. The access point set forth in claim 1 wherein said IP data passing through said first decoder is substantially all voice encoded data.

4. The access point set forth in claim 1 wherein said IP data passing through said second decoder is substantially all computer data.

* * * * *